US009563910B2

(12) United States Patent
Lee et al.

(10) Patent No.: US 9,563,910 B2
(45) Date of Patent: Feb. 7, 2017

(54) SHOWCASE SYSTEM HAVING TRANSPARENT DISPLAY PANEL AND OPERATING METHOD THEREOF

(71) Applicant: LG ELECTRONICS INC., Seoul (KR)

(72) Inventors: Ki Young Lee, Seoul (KR); Sung Wook Han, Seoul (KR); Jun Kim, Seoul (KR); Young Jun Lee, Seoul (KR); Jae Min Han, Seoul (KR); Joon Young Park, Seoul (KR)

(73) Assignee: LG ELCTRONICS INC., Seoul (KR)

( * ) Notice: Subject to any disclaimer, the term of this patent is extended or adjusted under 35 U.S.C. 154(b) by 0 days.

(21) Appl. No.: 14/359,434

(22) PCT Filed: Nov. 20, 2012

(86) PCT No.: PCT/KR2012/009811
§ 371 (c)(1),
(2) Date: May 20, 2014

(87) PCT Pub. No.: WO2013/077609
PCT Pub. Date: May 30, 2013

(65) Prior Publication Data
US 2014/0333541 A1 Nov. 13, 2014

(30) Foreign Application Priority Data
Nov. 21, 2011 (KR) .................. 10-2011-0121751

(51) Int. Cl.
*G06F 3/041* (2006.01)
*G06Q 30/06* (2012.01)
(Continued)

(52) U.S. Cl.
CPC ............ *G06Q 30/0623* (2013.01); *G06F 3/02* (2013.01); *G06F 3/041* (2013.01); *G06F 3/04886* (2013.01); *G09F 27/00* (2013.01)

(58) Field of Classification Search
CPC .......... G06F 3/041–3/04897; A47F 3/00–3/14
See application file for complete search history.

(56) References Cited

U.S. PATENT DOCUMENTS 4,223,966 A * 9/1980 Winters .................... A47F 3/12
108/109
4,598,341 A * 7/1986 Brackhahn .............. A47F 3/001
362/125
(Continued)

FOREIGN PATENT DOCUMENTS

CN 1646984 A 7/2005
CN 1870921 A 11/2006
(Continued)

OTHER PUBLICATIONS

Mediavissor, "Transparent LCD on fridge," YouTube online video, Sep. 4, 2011, 1 page.
(Continued)

*Primary Examiner* — Gene W Lee
(74) *Attorney, Agent, or Firm* — Birch, Stewart, Kolasch & Birch, LLP

(57) ABSTRACT

To achieve the objective of the present invention, a method for operating a showcase system having a transparent display panel according to one embodiment of the present invention comprises the steps of: receiving a touch input for a predetermined area of a transparent display panel; displaying an image keyboard; receiving product information; and connecting information on the predetermined area and the product information to store the connected information, or the invention comprises the steps of: recognizing a predetermined product; receiving a touch input for a predetermined area of a transparent display panel; and connecting (Continued)

information on the predetermined area and information on the predetermined product to store the connected information.

11 Claims, 20 Drawing Sheets

(51) Int. Cl.
  *G06F 3/0488* (2013.01)
  *G06F 3/02* (2006.01)
  *G09F 27/00* (2006.01)

(56) References Cited

U.S. PATENT DOCUMENTS

| | | | |
|---|---|---|---|
| 6,607,275 B1 | 8/2003 | Cimini et al. | |
| 7,978,184 B2 | 7/2011 | Morrison | |
| 8,417,376 B1* | 4/2013 | Smolen | 700/232 |
| 8,583,280 B1* | 11/2013 | Patel | 700/232 |
| 2003/0137828 A1* | 7/2003 | Ter-Hovhannisian | A47F 3/001 |
| | | | 362/92 |
| 2007/0062891 A1 | 3/2007 | Stievenard | |
| 2008/0192027 A1 | 8/2008 | Morrison | |
| 2008/0205042 A1 | 8/2008 | Shibusawa et al. | |
| 2012/0265713 A1* | 10/2012 | Kim | G09F 5/00 |
| | | | 705/500 |
| 2013/0211583 A1* | 8/2013 | Borra | G07F 11/00 |
| | | | 700/232 |

FOREIGN PATENT DOCUMENTS

| | | |
|---|---|---|
| CN | 201051974 Y | 4/2008 |
| CN | 101256049 A | 9/2008 |
| DE | 20016394 U1 | 7/2001 |
| EP | 1783705 A2 | 5/2007 |
| JP | 8-327209 A | 12/1996 |
| JP | 2000-276637 A | 10/2000 |
| KR | 2003-0042225 A | 5/2003 |
| KR | 20-2010-0005938 U | 6/2010 |

OTHER PUBLICATIONS

Paulandassociates, "Transparent Vending Machine," YouTube online video, Oct. 25, 2011, 1 page, XP54975889.

* cited by examiner (a)    (b)

SHOWCASE SYSTEM HAVING TRANSPARENT DISPLAY PANEL AND OPERATING METHOD THEREOF

This application is the National Phase of PCT/KR2012/009811 filed on Nov. 20, 2012, and under 35 U.S.C. 119(a) to Patent Application No. 10-2011-0121751 filed in Korea on Nov. 21, 2011, all of which are hereby expressly incorporated by reference into the present application.

TECHNICAL FIELD

The present invention relates to a showcase system having a transparent display panel and an operating method thereof and, more particularly, to a showcase system having a transparent display panel which may provide information regarding a product placed in a showcase in various convenient ways and an operating method thereof.

BACKGROUND ART

A showcase includes a showroom in which products can be exhibited. Typically, the front face of a showcase is formed of glass. Users can view products placed in the showroom through the front glass of the showcase.

DISCLOSURE

Technical Problem

It is an object of the present invention to provide a showcase system having a transparent display panel which may display information regarding a product placed in a showcase in an effective manner and an operating method thereof.

Technical Solution

In accordance with one embodiment of the present invention, the above and other objects can be accomplished by the provision of a method for operating a showcase system, the showcase system having a transparent display panel, the method including receiving touch input to a predetermined area of the transparent display panel, displaying an image keyboard, receiving product information, and mapping information regarding the predetermined area and the product information to each other to store the same.

In accordance with another embodiment of the present invention, there is provided a method for operating a showcase system, the showcase system having a transparent display panel, the method including recognizing a predetermined product, receiving touch input to a predetermined area of the transparent display panel, and mapping information regarding the predetermined area and information regarding the predetermined product to each other to store the same.

In accordance with another embodiment of the present invention, there is provided a method for operating a showcase system, the showcase system having a transparent display panel, the method including receiving touch input to at least one of a plurality of showrooms in which products are exhibited, and displaying an image associated with a product corresponding to the showroom that has received the touch input.

In accordance with a further embodiment of the present invention, there is provided a showcase system including a showcase including plurality of showrooms in which products are exhibited, a transparent display panel placed at the front side of the showrooms and a user input interface unit configured to receive touch input to at least one of the showrooms, and a signal processing device configured to output an image associated with a product corresponding to the showroom that has received the touch input, wherein the transparent display panel displays the image at an area thereof corresponding to the selected showroom.

Advantageous Effects

According to the embodiments of the present invention, as a transparent liquid crystal panel is installed to a front face of a showcase to display an image related to a product, improved product advertisement effects may be accomplished via exhibition of a product placed in a showroom as well as display of an image related to the product.

BEST MODE

Hereinafter, the present invention will be described in more detail with reference to the accompanying drawings.

With respect to constituent elements used in the following description, suffixes "module" and "unit" are given or mingled with each other only in consideration of ease in the preparation of the specification, and do not have or serve as different meanings.

Figure 1:
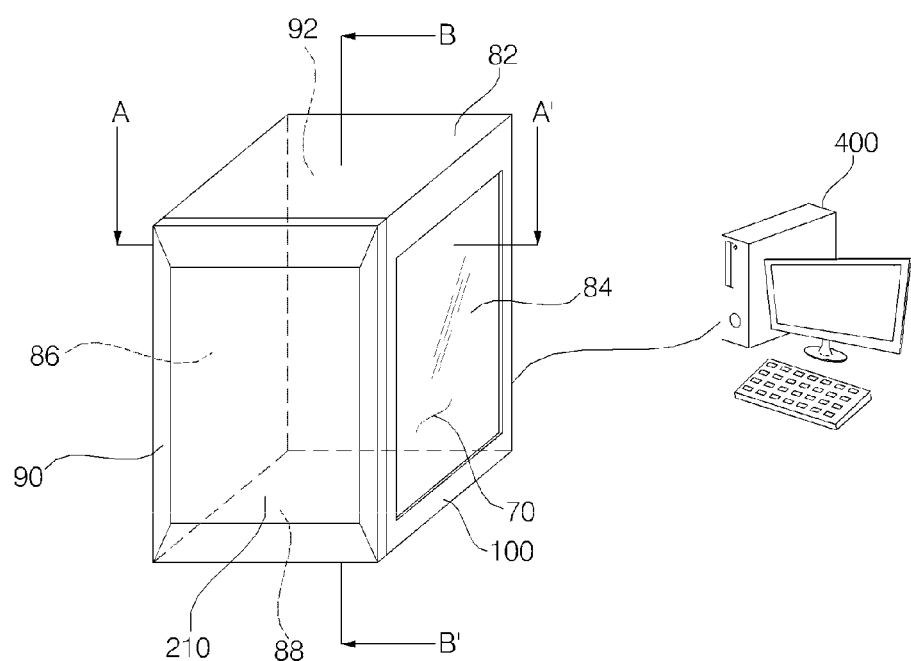
FIG. 1 is a view showing a configuration of a showcase system according to one embodiment of the present invention.

FIG. 1 is a view showing a configuration of a showcase system according to one embodiment of the present invention.

Referring to FIG. 1, the showcase system 50 according to the embodiment of the present invention may include a showcase 100 having a transparent display panel and a signal processing device 400 configured to output, e.g., a video signal or an audio signal to the showcase 100.

The showcase 100 according to the embodiment of the present invention may have a volumetric shape to internally define a showroom 70 in which a product can be placed. The drawing shows a hexahedral showcase 100.

To this end, the showcase 100 may include a transparent display panel, for example, a liquid crystal panel 210 provided at a front face thereof and a front frame 90 surrounding the liquid crystal panel 210.

In the embodiment of the present invention, as the transparent liquid crystal panel 210 is installed to the front face of the showcase 100 and an image related to a product is displayed on the liquid crystal panel 210. As such, through exhibition of the product in the showroom 70 and display of the image related to the product, improved product advertisement effects may be achieved.

In addition, the showcase 100 includes a right frame 84 provided at a right face thereof, a left frame 86 provided at a left face thereof, an upper frame 82 provided at an upper face thereof, a lower frame 88 provided at a lower face thereof, and a rear frame 92 provided at a rear face thereof.

In this case, a transparent right glass may be surrounded by the right frame 84. In addition, a transparent left glass may be surrounded by the left frame 86. With this configuration, a person can view the product placed in the showroom 70 through the left face and the right face of the showcase as well as the front face of the showcase, which may improve advertisement effects.

Alternatively, instead of the transparent right glass fitted into the right frame 84, a transparent liquid crystal panel may be provided. Likewise, instead of the transparent left glass fitted into the left frame 86, a transparent liquid crystal panel may be provided. Accordingly, since a person can view the product placed in the showroom 70 in any direction among front, right and left directions and the user can view the image related to the product via the liquid crystal panel, improved product advertisement effects may be achieved.

Meanwhile, although not shown in the drawing, a light source unit 175 may be located in the showcase 100, more particularly, in an upper region of the showcase. In the embodiment of the present invention, as the light source unit 175 is located between the front frame 90 and the upper frame 82 and, in particular, the light source unit 175 is obliquely arranged, it is possible to reduce shadowing of a product placed near the center of the showroom 70 due to light emitted from the light source unit 175. This will be described below with reference to FIG. 5.

Meanwhile, although not shown in the drawing, the showcase 100 may include a signal processing unit which receives a signal processed by the signal processing device 400 and processes the received signal. This will be described below.

The signal processing device 400 may process a video or audio signal stored in the signal processing device 400 to provide the showcase 100 with the processed signal, or may process a video or audio signal input via an external network to provide the showcase 100 with the processed signal. For example, the signal processing device 400 may be a personal computer (PC).

Alternatively, differently from the drawing, the signal processing device 400 may be incorporated in the showcase 100.

Figure 2:
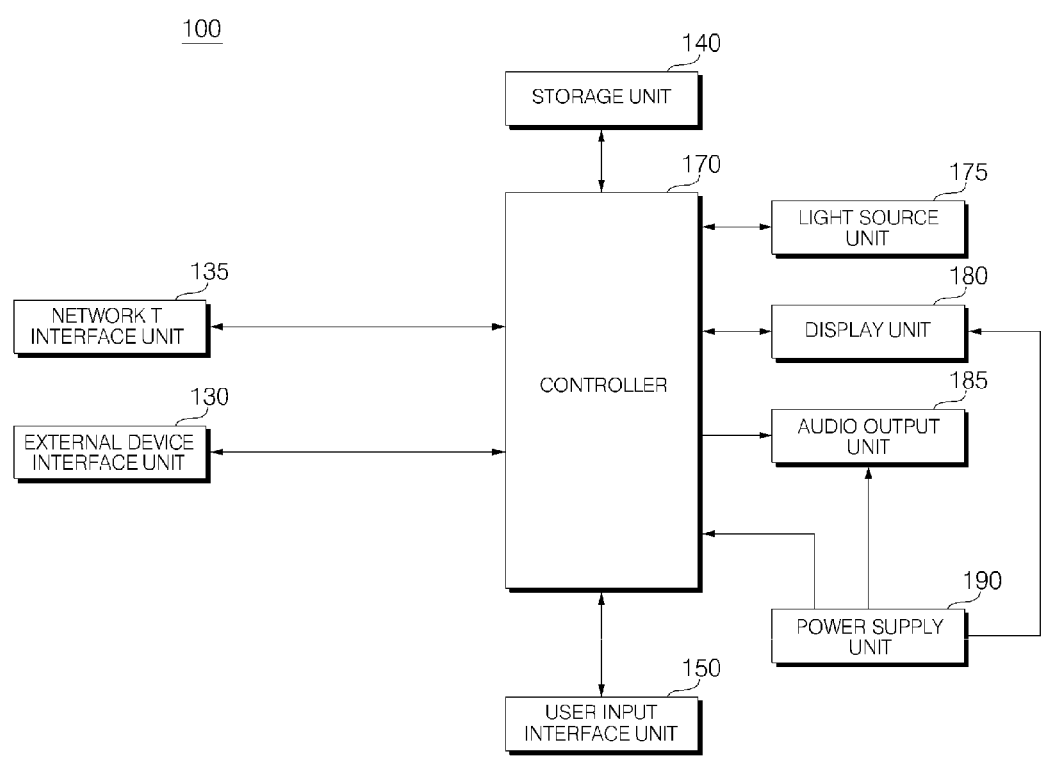
FIG. 2 is a block diagram showing one example of an inner configuration for signal processing in a showcase.

FIG. 2 is a block diagram showing one example of an inner configuration for signal processing in a showcase.

First, referring to FIG. 2, the showcase 100 according to one embodiment of the present invention may include an external device interface unit 130, a network interface unit 135, a storage unit 140, a user input interface unit 150, a controller 170, the light source unit 175, a display unit 180, an audio output unit 185 and a power supply unit 190.

The external device interface unit 130 may provide an interface to interconnect an external device and the showcase 100 in a wired or wireless manner. For example, the external device interface unit may receive at least one of a processed video signal and a processed audio signals input from the signal processing device 400. In addition, the external device interface unit may transmit data to the signal processing device 400.

The network interface unit 135 provides an interface to interconnect the showcase 100 and a wired/wireless network including the Internet. For example, the network interface unit 135 may receive content or data provided by an Internet or content provider or a network manager via a network.

The storage unit 140 may store programs for signal processing and control in the controller 170, and may store processed image, voice or data signals.

In addition, the storage unit 140 may function to temporarily store video, audio, or data signals to be input to the external device interface unit 130.

Although the embodiment of FIG. 2 illustrates that the storage unit 140 is provided separately from the controller 170, the scope of the present invention is not limited thereto. The storage unit 140 may be included in the controller 170.

The user input interface unit 150 may transmit a signal input by the user to the controller 170, or may transmit a signal from the controller 170 to the user.

For example, in a case in which a touch panel is disposed on the liquid crystal panel 210, the user input interface unit may receive a user touch input signal to transmit the user touch input signal to the controller 170, may transmit a user input signal input from a sensing unit (not shown) that senses a gesture of the user to the controller 170, or may transmit a signal from the controller 170 to the sensing unit (not shown).

The controller 170 may generate and output a signal for output of an image or voice by demultiplexing a stream input via the external device interface unit 130 or by processing demultiplexed signals.

An image signal processed in the controller 170 may be input to the display unit 180 such that an image corresponding to the image signal is displayed on the display unit. In addition, the image signal processed in the controller 170 may be input to an external output device via the external device interface unit 130.

An audio signal processed in the controller 170 may be output as sound via the audio output unit 185.

Although not shown in FIG. 2, the controller 170 may include a demultiplexer, an image processor and the like. This will be described below with reference to FIG. 4.

In addition, the controller 170 may control general operations of inner components of the showcase 100.

In addition, the controller 170 may control the showcase 100 in response to a user instruction input via the user input interface unit 150, or using inner programs thereof.

Meanwhile, the controller 170 may control the display unit 180 to display an image. In this case, the image displayed on the display unit 180 may be a still image or a moving image and may be a 2D image or a 3D image.

The display unit 180 generates a drive signal by converting an image signal, a data signal, an OSD signal and a control signal processed in the controller 170, or by converting an image signal, a data signal, a control signal and the like received from the external device interface unit 130.

The display unit 180, according to the embodiment of the present invention, may include a transparent display panel. For example, the display unit may include a liquid crystal panel. In this case, the liquid crystal panel does not include a backlight.

The audio output unit 185 outputs voice upon receiving an audio signal processed in the controller 170.

Meanwhile, to sense a gesture of the user, as described above, the showcase 100 may further include the sensing unit (not shown) which includes at least one of a touch sensor, a voice sensor, a position sensor and a motion sensor. A signal sensed by the sensing unit (not shown) is transmitted to the controller 170 via the user input interface unit 150.

The controller 170 may sense a gesture of the user based on an image captured by an image capture unit (not shown), a signal sensed by the sensing unit (not shown), or combinations thereof.

The power supply unit 190 supplies corresponding power to the entire showcase 100. In particular, the power supply unit may supply power to the controller 170 that may take the form of a System On Chip (SOC), the display unit 180 for display of an image, and the audio output unit 185 for audio output.

To this end, the power supply unit 190 may include a converter (not shown) to convert Alternating Current (AC) power into Direct Current (DC) power. In addition, the power supply unit may further include a DC/DC converter that changes the level of DC power and outputs the DC power having the changed level.

Meanwhile, although not shown in the drawing, the showcase 100 may further include a broadcast receiver (not shown). For example, the broadcast receiver may include a tuner (not shown) and a demodulator (not shown) for broadcast reception and signal processing.

Meanwhile, the block diagram of the showcase 100 shown in FIG. 2 shows one embodiment of the present invention. Respective components of the block diagram may be integrated, added, or omitted according to the specification of the showcase 100. That is, two or more components may be combined into a single component, or a single component may be divided into two or more components as needed. In addition, functions of respective blocks are merely given for explanation of the embodiment of the present invention and the scope of the present invention is not limited by concrete operations or devices related to the functions.

Figure 3:
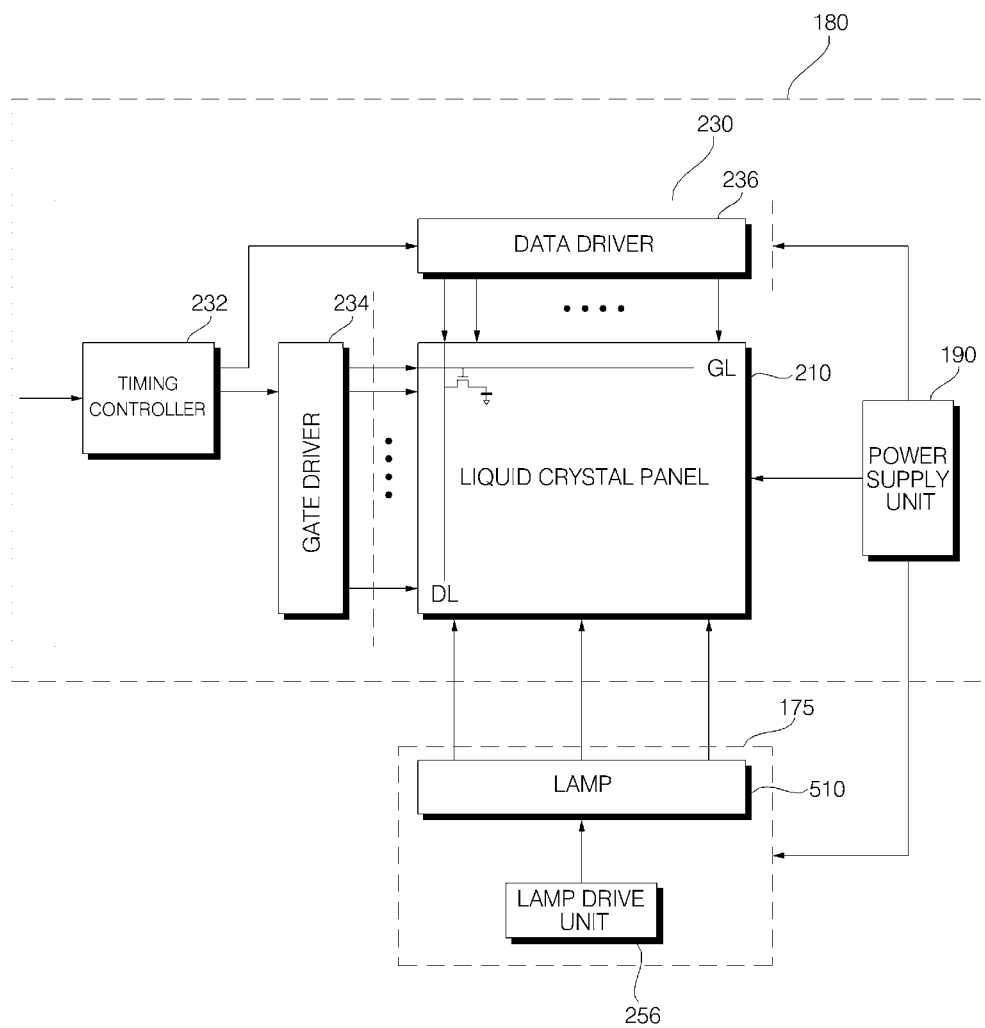
FIG. 3 is a view showing one example of an inner configuration of a display unit shown in FIG. 2.

FIG. 3 is a view showing one example of an inner configuration of the display unit shown in FIG. 2.

Referring to the drawing, the display unit 180 in the showcase 100 includes the liquid crystal display panel 210 and a drive circuit unit 230.

Referring to the drawing, the display unit 180 includes the liquid crystal panel 210 and the drive circuit unit 230.

Meanwhile, a conventional backlight unit is coupled to the liquid crystal panel 210 in the display unit 180 and supplies generated light to the liquid crystal panel 210.

However, according to the embodiment of the present invention, the backlight unit, i.e. the light source unit 175 is spaced apart from the liquid crystal panel 210. That is, as described above with reference to FIG. 1, the light source unit 175 may be provided as a separate unit that is obliquely installed in the upper region of the showcase 100.

In this way, the liquid crystal panel 210, which is a transparent display panel separated from the light source unit 210, displays a corresponding image upon receiving an image signal and, more particularly, displays a transparent image to allow a product in the showcase 100 to be visible.

To display an image, the liquid crystal panel 210 includes a first substrate on which a plurality of gate lines GL and data lines DL intersect one another to form a matrix and thin film transistors and pixel electrodes connected to the respective thin film transistors are arranged at intersections of the gate lines and the data lines, a second substrate having a common electrode, and a liquid crystal layer formed between the first substrate and the second substrate. Meanwhile, a color filter for color display may further be disposed on the second substrate.

The drive circuit unit 230 drives the liquid crystal panel 210 using a control signal and a data signal supplied from the controller 170 of FIG. 2. To this end, the drive circuit unit 230 may include a timing controller 232, a gate driver 234 and a data driver 236.

The timing controller 232 receives a control signal, R, G and B data signals, a vertical synchronization signal Vsync and the like from the controller 170. Thereby, the timing controller controls the gate driver 234 and the data driver 236 in response to the control signal, and rearranges the R, G and B data signals to provide the same to the data driver 236.

Meanwhile, through control of the gate driver 234, the data driver 236 and the timing controller 232, a scan signal and an image signal are supplied to the liquid crystal panel 210 through the gate lines GL and the data lines DL.

Although the drawing shows the drive circuit unit 230 as including the timing controller 232, the gate driver 234 and the data driver 236, alterations in terms of configuration are possible. For example, the gate driver 234 and the data driver 236 may be embedded in an upper portion and/or a lower portion of the front frame 90 of the showcase 100, and the timing controller 232 may be located at a left portion of the front frame 90 of the showcase 100.

The light source unit 175 supplies light into the showroom 70 of the showcase 100. In the embodiment of the present invention, to reduce shadowing of a product placed near the center of the showroom 70 due to light of the light source unit 175, the light source unit 175 is located between the front frame 90 and the upper frame 82. In particular, the light source unit is obliquely arranged between the front frame 90 and the upper frame 82. This will be described below with reference to FIG. 5.

Meanwhile, the light source unit 175 may include lamps 510 as a light source and a lamp drive unit 256 to turn the lamps 510 on or off.

When the plurality of lamps 510 is turned on, light emitted from the lamps 50 is directed to a product placed near the center of the showroom 70.

Meanwhile, the liquid crystal panel 210 may display an image based on an input image signal using light directed into the showroom 70.

Meanwhile, the plurality of lamps 510 may include Light Emitting Diodes (LEDs).

The power supply unit 190 may supply a common electrode voltage Vcom to the liquid crystal panel 210 and may supply a gamma voltage to the data driver 236. In addition, the power supply unit may supply drive power, required to drive the lamps 510, to the light source unit 175.

Figure 4:
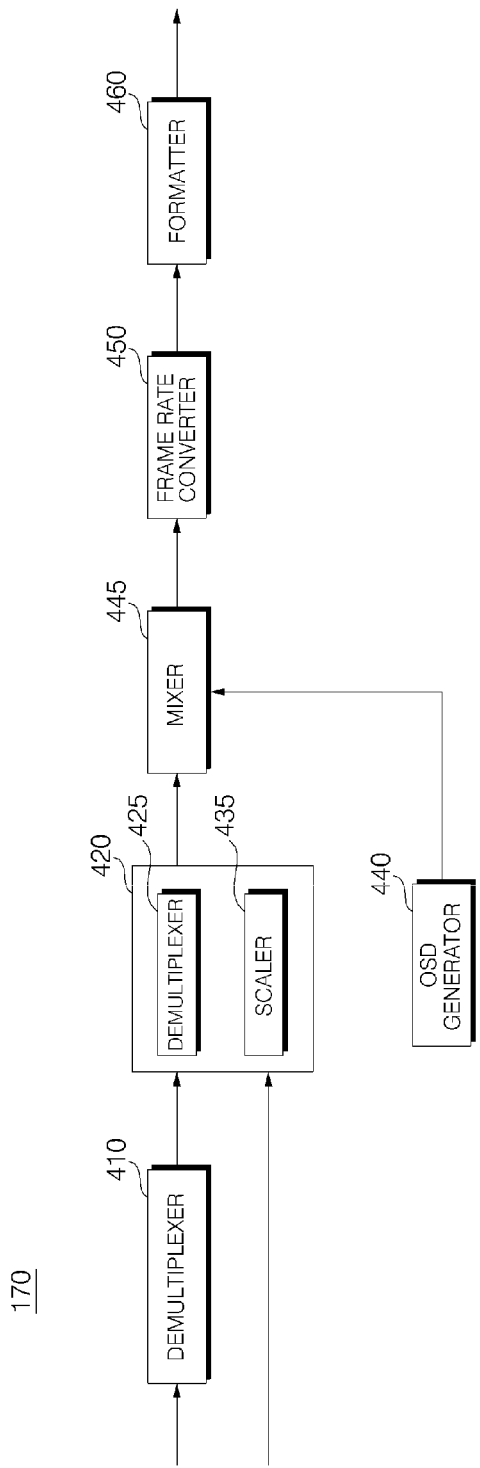
FIG. 4 is a block diagram showing an inner configuration of a controller shown in FIG. 2.

FIG. 4 is a block diagram showing an inner configuration of the controller shown in FIG. 2.

Explaining the controller with reference to the drawing, the controller 170 according to one embodiment of the present invention may include a demultiplexer 410, an image processor 420, an OSD generator 440, a mixer 445, a frame rate converter 450 and a formatter 460. In addition, the controller may further include a voice processor (not shown) and a data processor (not shown).

The demultiplxer 410 may demultiplex an input stream. For example, when MPEG-2 TS is input, the demultiplexer may separate the same into image, voice and data signals via demultiplexing.

The image processor 420 may process a demultiplexed image signal. To this end, the image processor 420 may include an image decoder 425 and a scaler 435.

The image decoder 425 may decode the demultiplexed image signal and the scaler 435 may implement scaling to allow the display unit 180 to output resolution of the decoded image signal. The image decoder 425 may have one of various standards.

The OSD generator 440 generates an OSD signal in response to user input or by itself. For example, the OSD generator may generate a signal to display various graphic or text information on a screen of the display unit 180 based on a user input signal. The generated OSD signal may include various data including a user interface screen, various menu screens, widgets, icons and the like that may be displayed on the liquid crystal panel 210 of the showcase 100.

The mixer 445 may mix the OSD signal generated by the OSD generator 440 with the decoded image signal processed by the image processor 420. The mixed image signal is transmitted to the frame rate converter 450.

The frame rate converter (FRC) 450 may convert the frame rate of an input image. Meanwhile, the frame rate converter 450 may directly output the image signal without conversion of the frame rate.

The formatter 460 receives the mixed signals, i.e. the OSD signal and the decoded image signal from the mixer 445, and outputs the signals after changing the signals into a format suitable for the display unit 180. For example, the formatter may output R, G and B data signals via Low Voltage Differential Signaling (LVDS) or mini-LVDS.

Meanwhile, the formatter 460 may change the format of a 3D image signal, or may convert a 2D image signal into a 3D image signal, for display of a 3D image.

Meanwhile, the voice processor (not shown) in the controller 170 may implement voice processing of a demultiplxed audio signal. To this end, the voice processor (not shown) may include various decoders.

In addition, the voice processor (not shown) in the controller 170 may process base, treble, and sound-level adjustment, for example.

The data processor (not shown) in the controller 170 may implement data processing of a demultiplexed data signal.

Meanwhile, the block diagram of FIG. 4 shows the controller 170 according to one embodiment of the present invention. The respective components of the block diagram may be integrated, added, or omitted according to actually realizable specification of the controller 170.

In particular, the frame rate converter 450 and the formatter 460 may be not included in the controller 170 and be separately provided.

Figure 5:
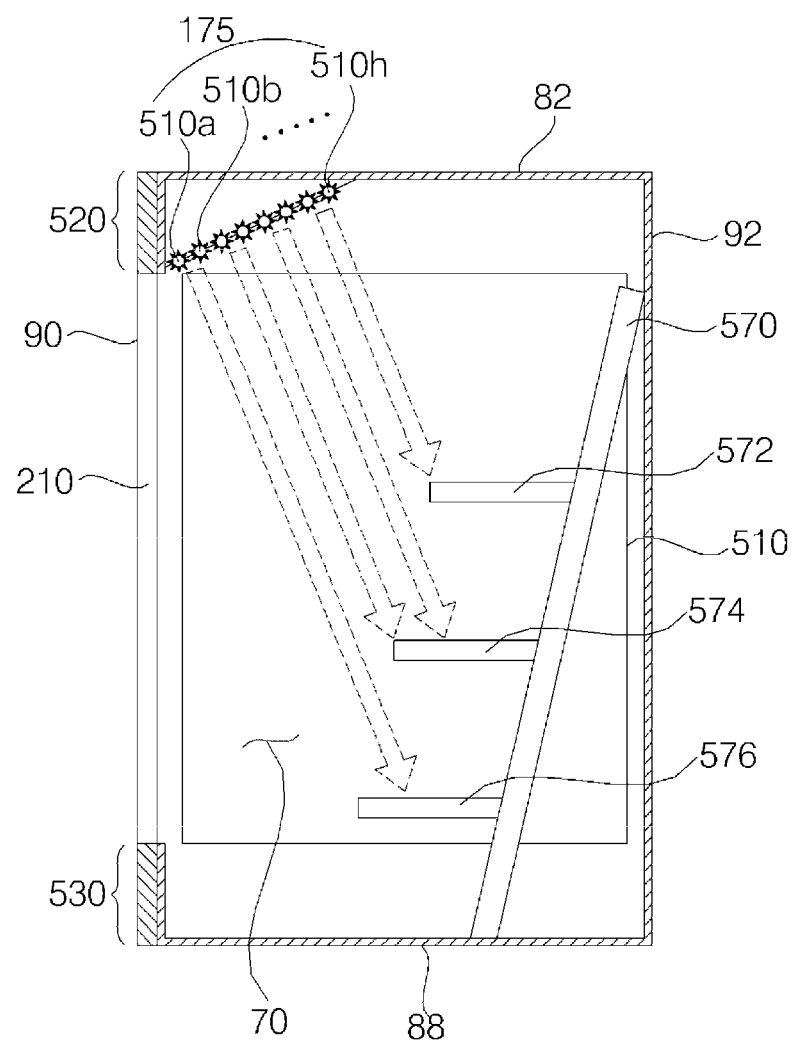
FIG. 5 is a sectional view taken along line A-A' of the showcase shown in FIG. 1 according to one example.

FIG. 5 is a sectional view taken along line A-A' of the showcase shown in FIG. 1 according to one example.

Referring to the drawing, the showcase 100 cut along A-A' of FIG. 1 is shown in FIG. 5 in sectional view.

In the embodiment of the present invention, the lamps 510*a*, 510*b*, . . . , 510*h* of the light source unit 175 may be obliquely arranged in the upper region of the showcase 100.

More specifically, assuming that the front frame 90 is divided into the transparent liquid crystal panel 210, an opaque upper portion 520 and an opaque lower portion 530, the lamps 510*a*, 510*b*, . . . , 510*h* of the light source unit 175 may be arranged in a region corresponding to the upper portion 520 of the front frame 90. Thereby, the light source unit 175 is invisible from the front of the showcase 100.

Meanwhile, to minimize shadowing of a product placed in the showroom 70 of the showcase 100 by uniformly transmitting light from the light source unit 175 to the product, the lamps 510*a*, 510*b*, . . . , 510*h* of the light source unit 175 are preferably obliquely arranged.

More specifically, preferably, the lamps 510*a*, 510*b*, . . . , 510*h* of the light source unit 175 are arranged between the upper portion 520 of the front frame 90 and the upper frame 82 and are obliquely arranged in a direction from the upper portion 520 of the front frame 90 to the upper frame 82. That is, preferably, a second lamp 510*b* is located higher than a first lamp 510*a* and an eighth lamp 510*h* is located higher than the second lamp 510*b*.

In this way, the light source unit 175 is invisible from the front of the showcase 100 and light from the light source unit 175 is uniformly transmitted to the product placed in the showroom 70 to minimize shadowing of the product.

Meanwhile, the lamps 510*a*, 510*b*, . . . , 510*h* of the light source unit 175 may be attached to a fixing member (not shown). In this case, the fixing member may be obliquely installed between the front frame 90 and the upper frame 82.

Meanwhile, as exemplarily shown in FIG. 5, a multi-stage display stand 570 may be placed in the showroom 70.

The display stand 570 is preferably tilted from the rear frame 92 to the lower frame 88.

When the lamps 510*a*, 510*b*, . . . , 510*h* of the light source unit 175 are obliquely arranged between the upper portion 520 of the front frame 90 and the upper frame 82, to allow light emitted from the lamps 510*a*, 510*b*, . . . , 510*h* of the light source unit 175 to uniformly reach products in upper and lower regions of the showroom 70, in the embodiment of the present invention, the display stand 570 is tilted from the rear frame 92 to the lower frame 88.

With this configuration, when using the multi-stage display stand 570, light may be uniformly emitted to products placed at respective stages.

Meanwhile, although the drawing illustrates the display stand having three shelves 572, 574 and 576, various alterations are possible. For example, a shelf located lower than others may have a longer length. More specifically, the length of a second shelf 574 may be longer than the length of a first shelf 572 and the length of a third shelf 576 may be longer than the length of the second shelf 814. Thereby, light may reach a product on a lower shelf without being blocked by an upper shelf or a product on the upper shelf.

Meanwhile, all reflectors in the showroom 70 of the showcase 100 are preferably formed of white or transparent materials in consideration of reflection of light. More specifically, inner surfaces of the rear frame 92 and the lower frame 88 inside the showroom 70 are preferably formed of white materials for reflection. In addition, the display stand 570 and the shelves 572, 574 and 576 are preferably formed of white or transparent materials.

Figure 6:
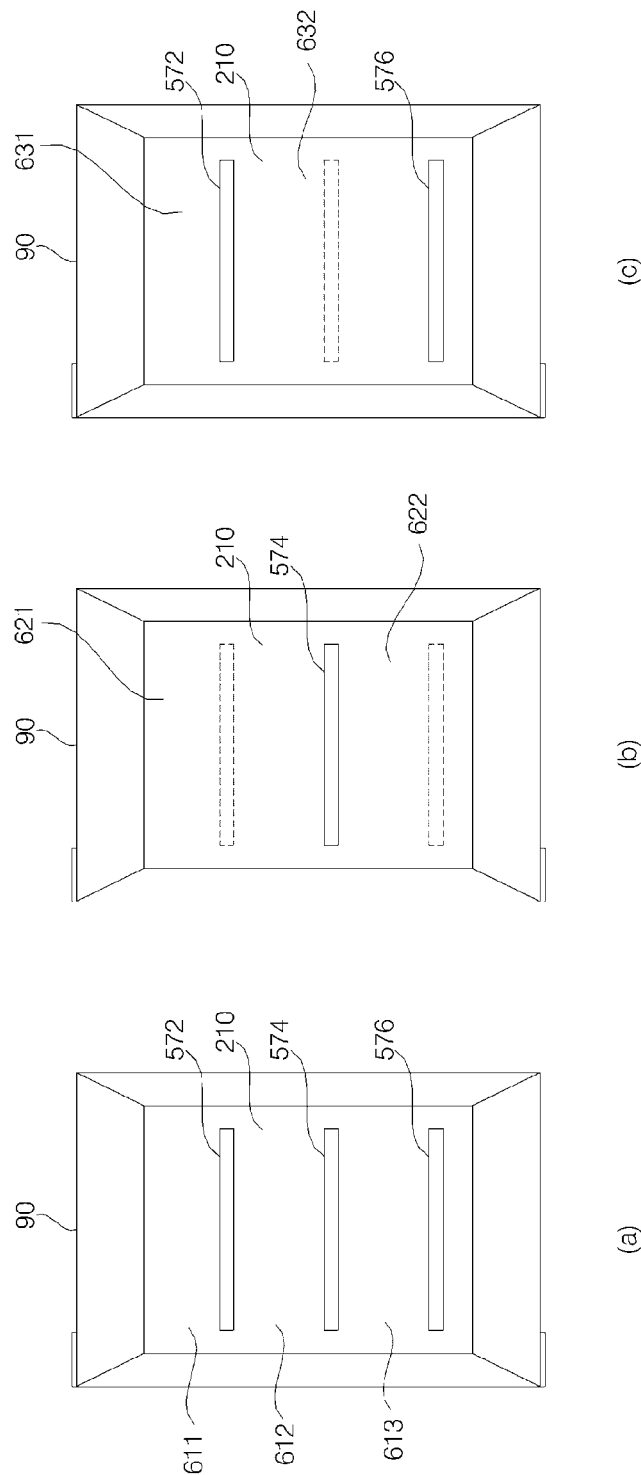
FIGS. 6 and 7 are views explaining various examples of the arrangement of shelves shown in FIG. 5.

FIG. 6 is a view explaining various examples of the arrangement of shelves shown in FIG. 5.

Referring to the drawing, FIGS. 6(*a*) to 6(*c*) are front views of the showcase 100 and show one example of the transparent liquid crystal panel 210 and the display stand 570 placed in the showroom 70.

First, (a) of FIG. 6 shows that all three shelves 572, 574 and 576 included in the three-stage display stand of FIG. 5 are coupled to the display stand to divide the showroom into three exhibition spaces having the same volume, i.e. showrooms 611, 612 and 613.

Next, (b) of FIG. 6 shows that the first shelf 572 and the third shelf 576 among the three shelves 572, 574 and 576 are removed and only the second shelf 574 is coupled to the display stand to divide the showroom into two exhibition spaces having different volumes, i.e. showrooms 621 and 622.

Next, (c) of FIG. 6 shows that the second shelf 574 among the three shelves 572, 574 and 576 is removed and the first shelf 572 and the third shelf 576 are coupled to the display stand to divide the showroom into two exhibition spaces having different volumes, i.e. showrooms 631 and 632.

Accordingly, through attachment or detachment of the multiple shelves to or from the display stand 571 according to the embodiment of the present invention, the arrangement of products in the showroom of the showcase may be simply changed. More specifically, assuming that the front frame takes the form of a door, a desired shelf may be attached to or detached from the display stand through the open front door.

Figure 7:
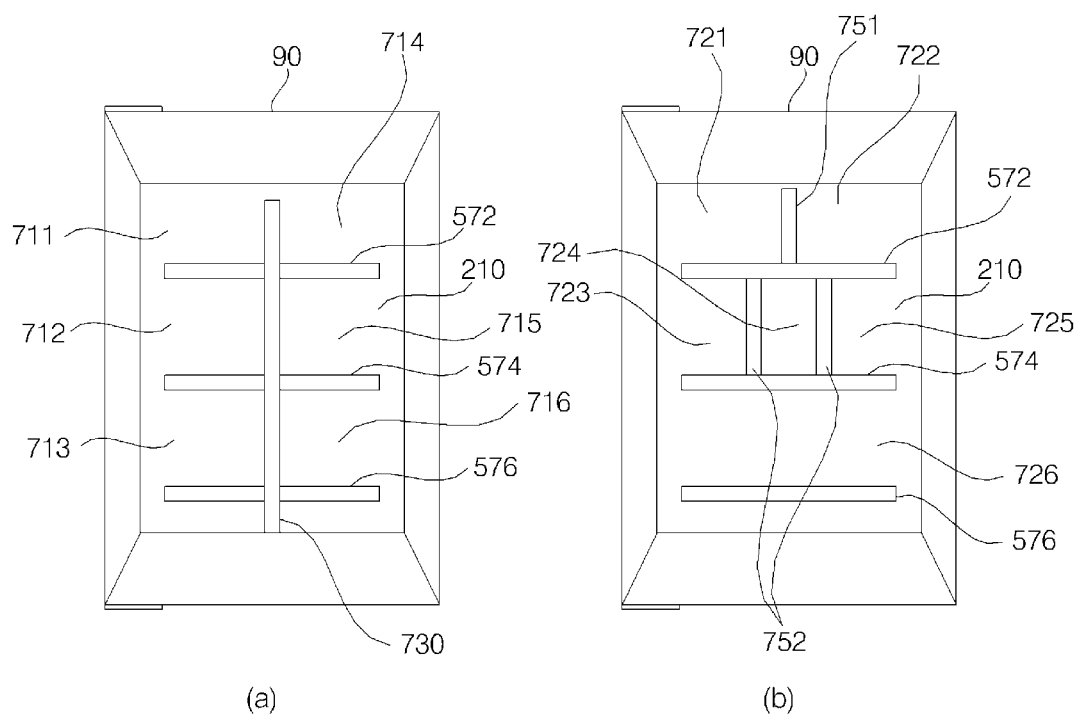

FIG. 7 is a view explaining an example in which a partition is added to the shelves as described above with reference to FIG. 6 to define a greater number of showrooms.

As exemplarily shown in (a) of FIG. 7, a vertically elongated partition 730 is added to the configuration of (a) of FIG. 6 to define six equal showrooms 711, 712, 713, 714, 715 and 716. Here, the partition 730 may be integrally fabricated with the shelves 572, 574 and 576, or may be separately prefabricated and assembled. In addition, the partition 730 may be a plurality of pieces.

As exemplarily shown in (b) of FIG. 7, a single partition 751 is added to the first shelf 572 and two partitions 752 are added to the second shelf to define showrooms 721, 722, 723, 724, 725 and 726 having various volumes.

Figure 8:
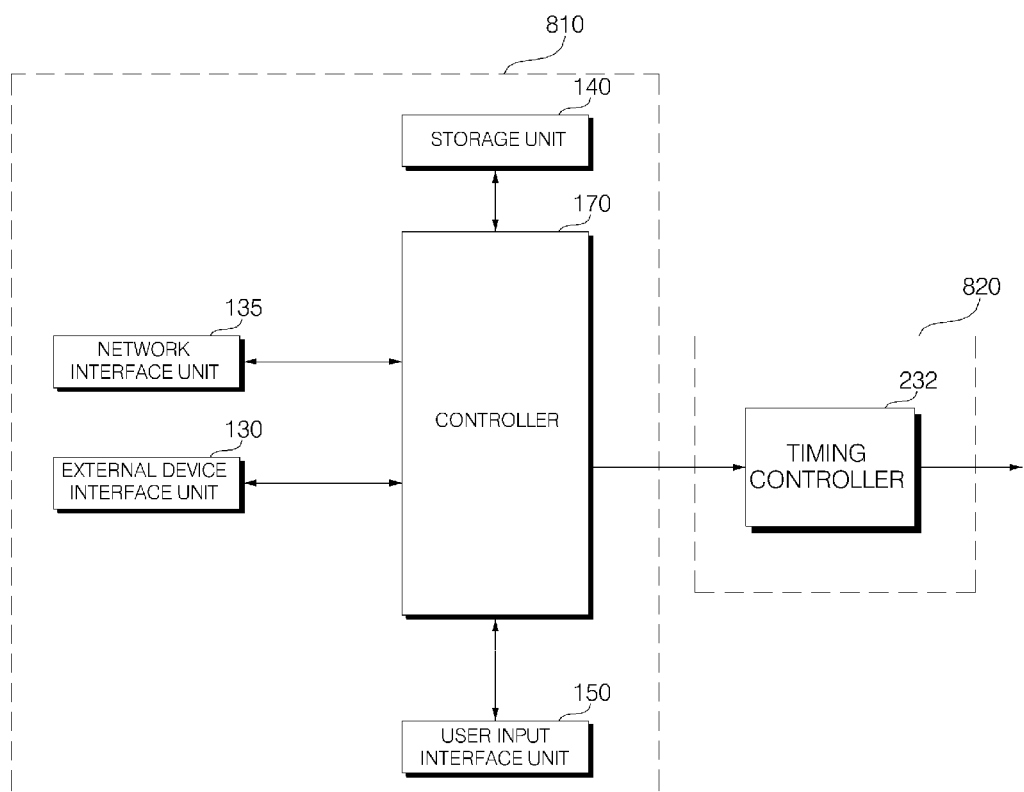
FIG. 8 is a block diagram showing an inner configuration of a signal processing unit included in the showcase of FIG. 1.

FIG. 8 is a block diagram showing an inner configuration of a signal processing unit included in the showcase of FIG. 1.

Referring to the drawing, FIG. 8 shows the signal processing unit 810. The signal processing unit 810 may be separated from a timing controller board 820.

The signal processing unit 810 may process a video signal for display of an image on the liquid crystal panel 210.

Accordingly, the signal processing unit 810 may include the external device interface unit 130, the network interface unit 135, the storage unit 140, the user input interface unit 150 and the controller 170.

Operation of the respective units 130, 135, 140, 150 and 170 in the signal processing unit 810 has been described above with reference to FIG. 2 and thus, a description thereof will be omitted hereinafter.

Meanwhile, a control signal, R, G and B data signals, a vertical synchronization signal Vsync and the like processed by the signal processing unit 810 are LVDS signals and may be transmitted to the timing controller board 820.

The timing controller 232 in the timing controller board 820 may process the control signal, R, G and B data signals, vertical synchronization signal Vsync and the like to generate and output a data drive signal and a gate drive signal.

Meanwhile, as described above, the timing controller board 820 may further include the gate driver 234 and the data driver 236, in addition to the timing controller 232. In this case, the timing controller board 820 may correspond to the drive circuit unit 230 as described above with reference to FIG. 3.

Figure 9:
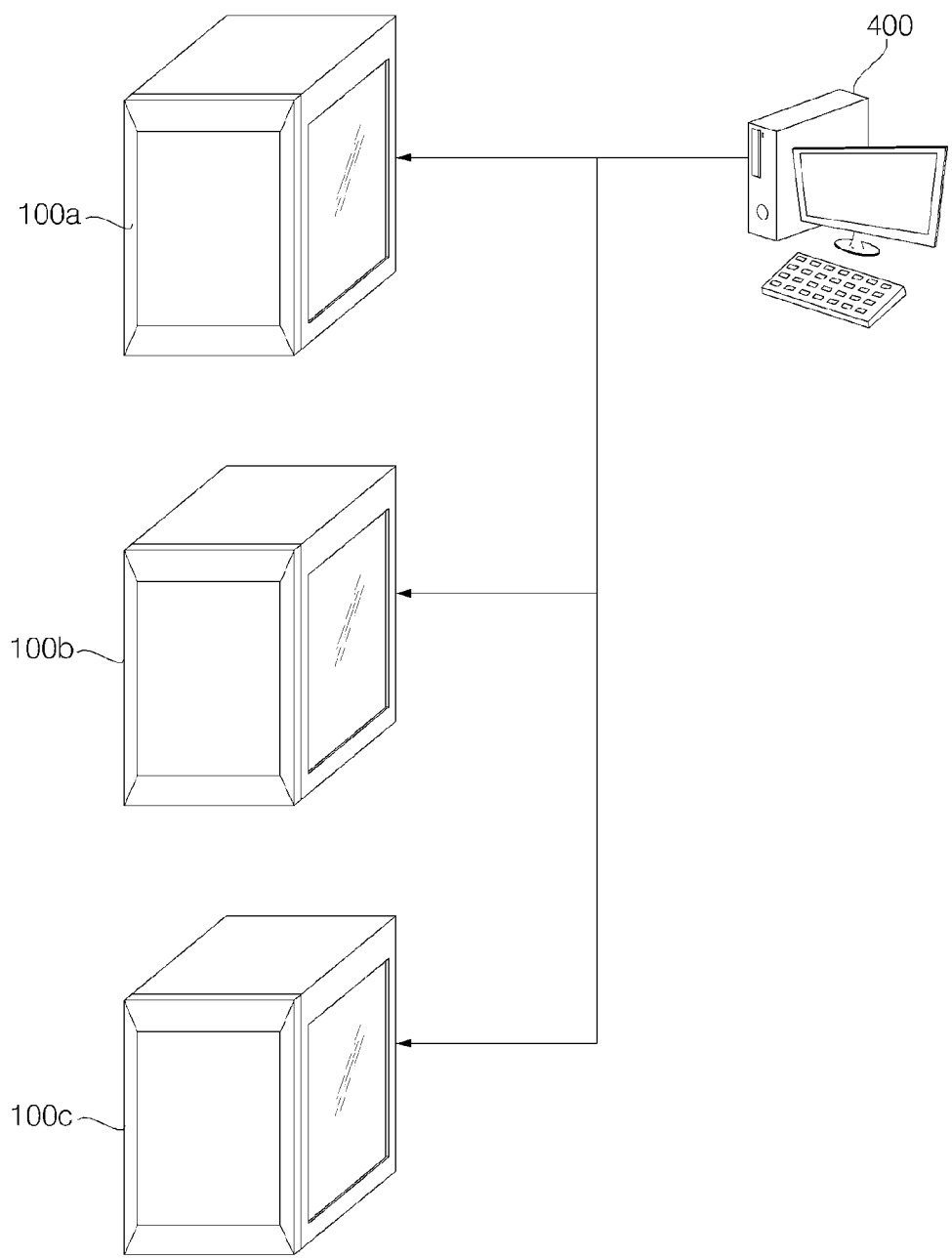
FIG. 9 is a view schematically showing a configuration of a showcase system according to another embodiment of the present invention.
Figure 10:
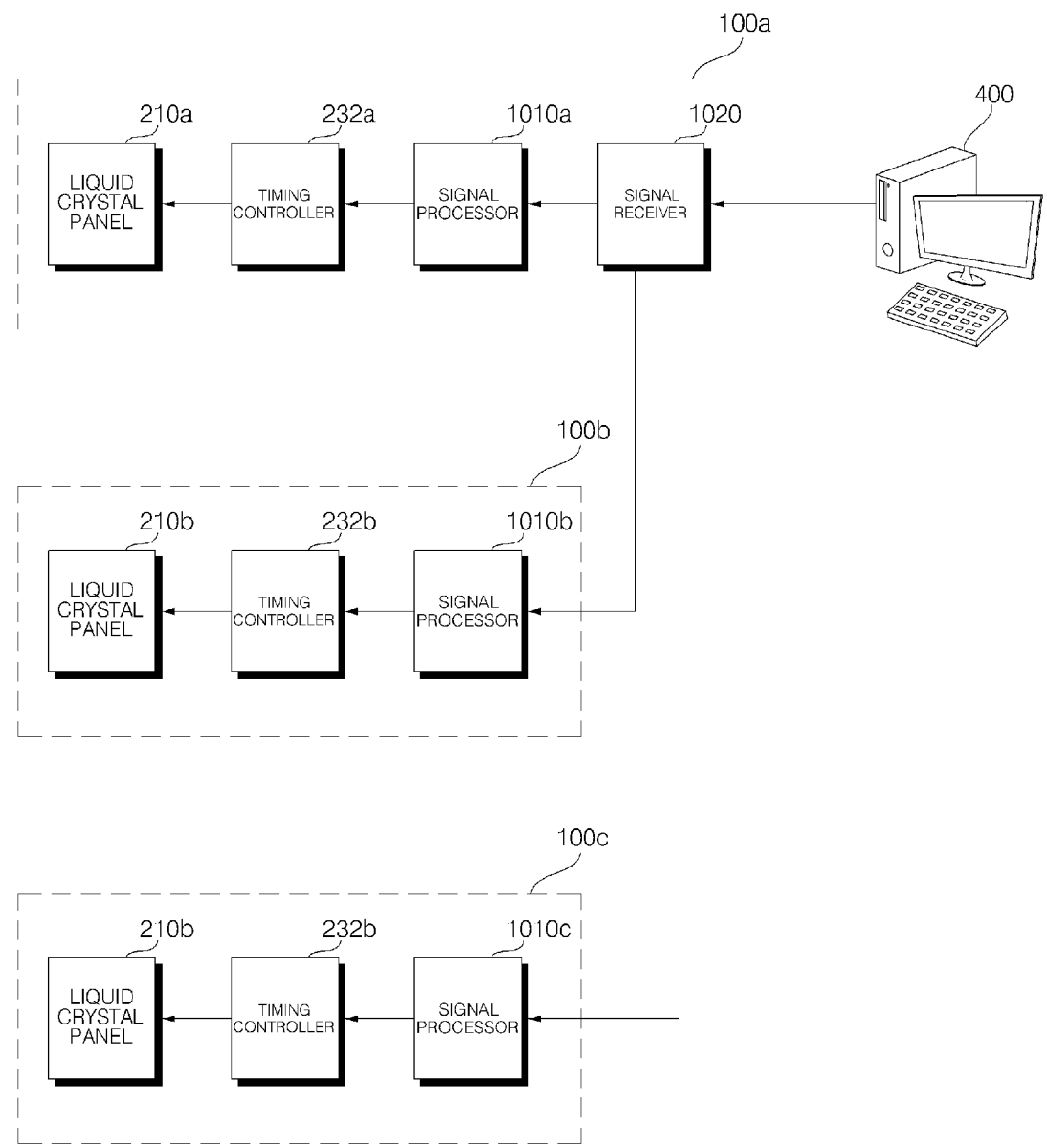
FIG. 10 is a block diagram schematically showing an inner configuration of the showcase system shown in FIG. 9.

FIG. 9 is a view schematically showing a configuration of a showcase system according to another embodiment of the present invention, and FIG. 10 is a block diagram schematically showing an inner configuration of the showcase system shown in FIG. 9.

Referring to the drawing, the showcase system 900 of FIG. 9 may include a plurality of showcases 100*a*, 100*b* and 100*c* and the signal processing device 400.

The showcases 100*a*, 100*b* and 100*c* may be arranged next to one another. As such, the signal processing device 400 may provide the respective showcases 100*a*, 100*b* and 100*c* arranged next to one another with related images.

FIG. 9 shows that the signal processing device 400 provides the respective showcases 100*a*, 100*b* and 100*c* with corresponding image signals, for example. That is, the same image may be provided to all of the showcases 100*a*, 100*b* and 100*c*, or different images may be provided to the respective showcases 100*a*, 100*b* and 100*c*.

Figure 16:
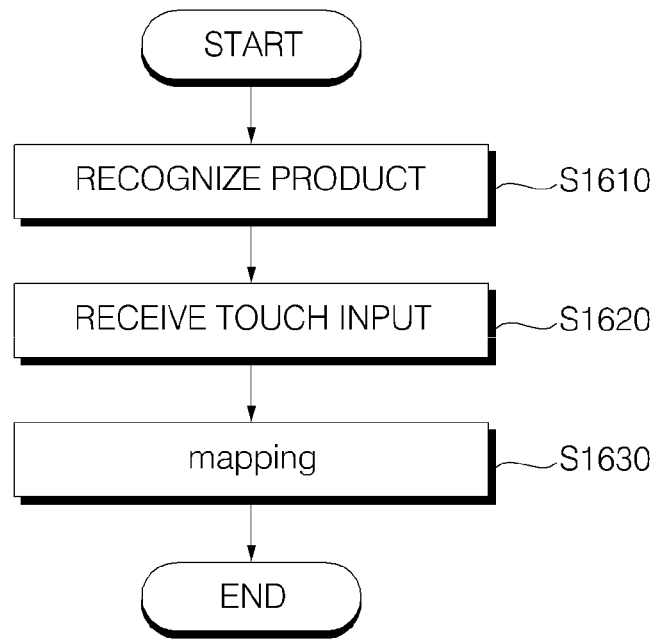
FIG. 16 is a flowchart showing a showcase system operating method according to an embodiment of the present invention.

Meanwhile, as exemplarily shown in FIG. 16, the signal processing device 400 may provide the first showcase 100*a* with images that will be displayed respectively on the showcases 100*a*, 100*b* and 100*c*. In this case, the first showcase 100*a* may distribute received first to third images to the second showcase 100*b* and the third showcase 100*c*.

To this end, as exemplarily shown in FIG. 16, the first showcase 100*a* may further include a signal receiver 1020, differently from the other showcases 100*b* and 100*c*. The signal receiver serves to receive images from the signal processing device 400 and to distribute the images to the respective showcases.

Meanwhile, the respective showcases 100*a*, 100*b* and 100*c* may include signal processors 1010*a*, 1010*b* and 1010*c* for signal processing of input images, timing controllers 232*a*, 232*b* and 232*c* for conversion of a processed video signal into a gate drive signal and a data drive signal, and transparent liquid crystal panels 210*a*, 210*b* and 210*c* for display an image in response to a corresponding drive signal.

Figure 11:
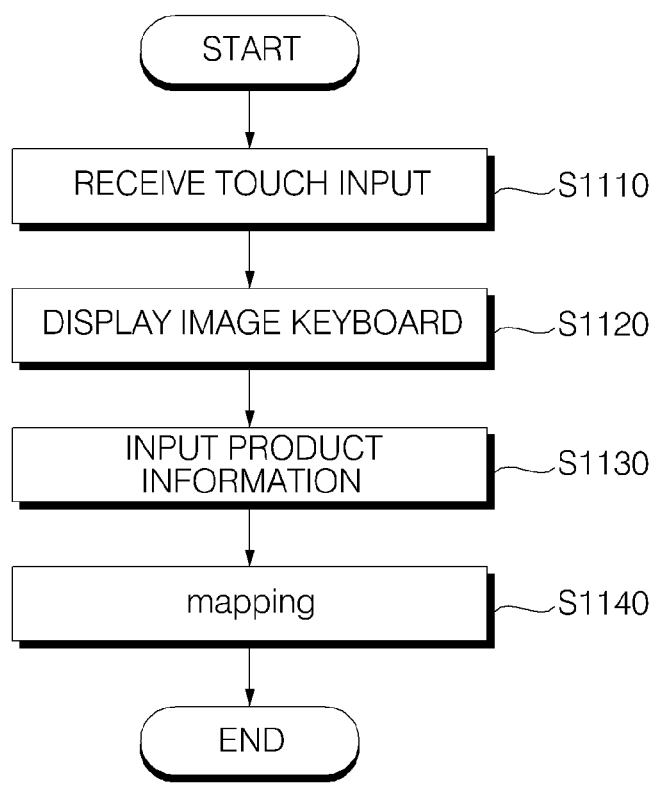
FIG. 11 is a flowchart showing a showcase system operating method according to an embodiment of the present invention.

FIG. 11 is a flowchart showing a showcase system operating method according to an embodiment of the present invention, and FIGS. 12 to 15 are reference views for explanation of various examples of the showcase system operating method of FIG. 11.

Referring to the drawings, a method for operating a showcase system having a transparent display panel according to the embodiment of the present invention includes receiving touch input to a predetermined area 1220 of the transparent display panel 1200 (S1110).

Figure 12:
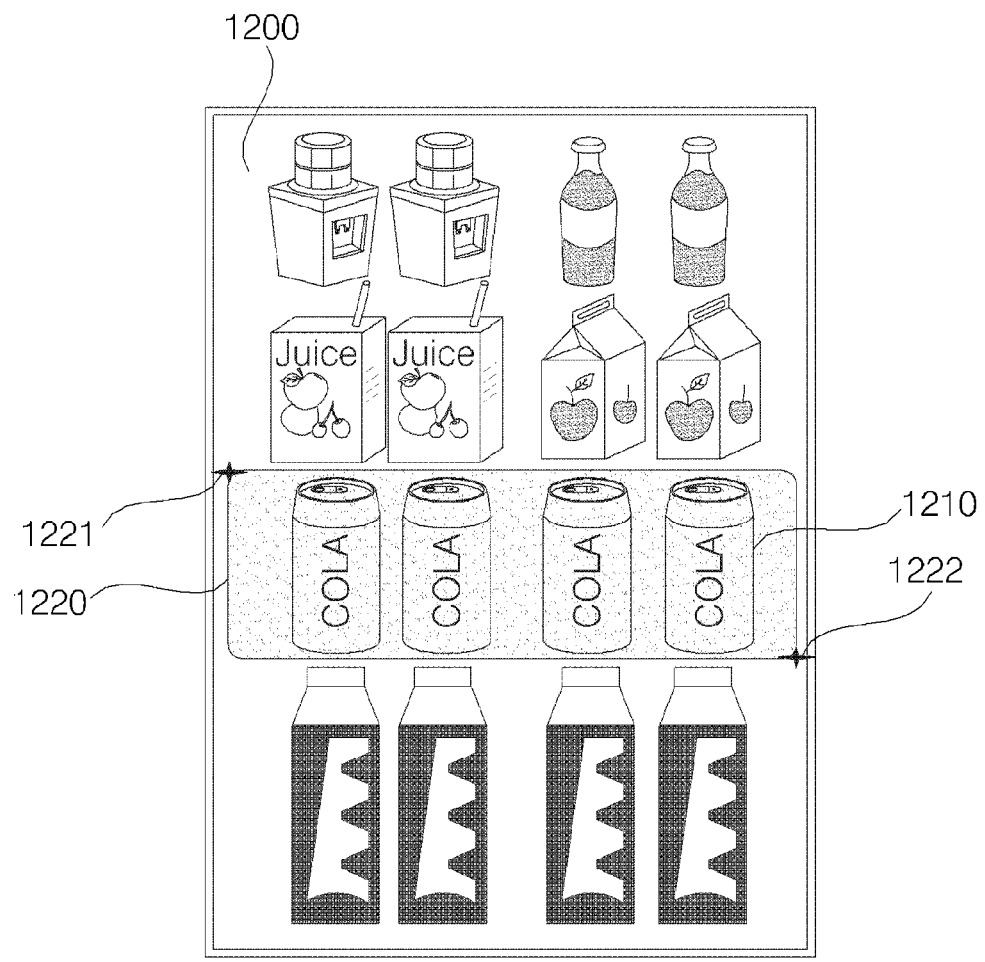
FIGS. 12 to 15 are reference views for explanation of various examples of the showcase system operating method of FIG. 11.

As exemplarily shown in FIG. 12, the corresponding predetermined area may be designated and managed by coordinates P1 (x1, y1) and P2 (x2, y2). Meanwhile, in a case in which a user touches a portion of an area in which the same products 1210 are displayed or touches one or more areas among a plurality of areas corresponding to a plurality of showrooms, the area(s) including the touch point may be selected as the predetermined area.

Meanwhile, the showcase system displays an image keyboard 1310 based on the received touch input (S1120).

Figure 13:
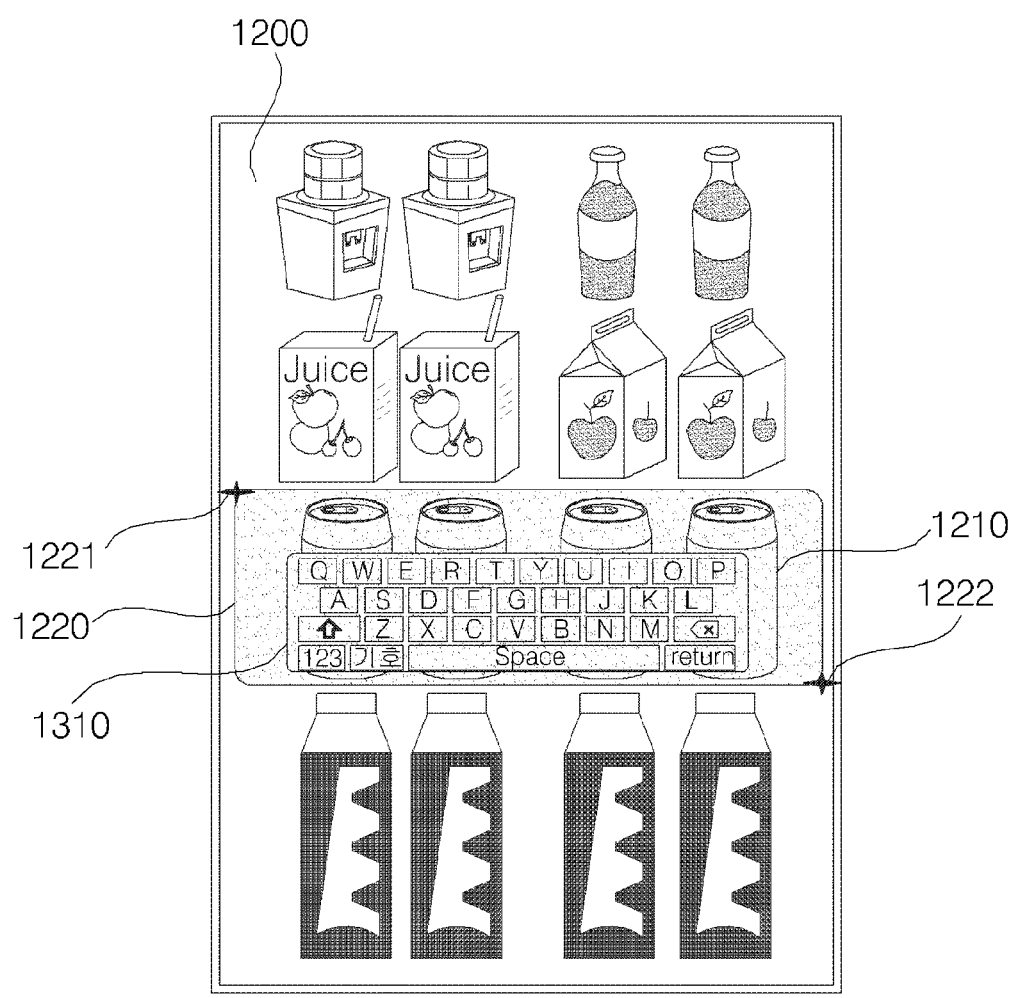

As exemplarily shown in FIG. 13, the image keyboard 1310 may be displayed to overlap at least a portion of the predetermined area 1220. As such, the user may intuitively recognize an area where touch input can be performed.

Alternatively, the image keyboard 1310 may be displayed above or below the area 1220 including the touch point, or may be displayed at an appropriate position based on a sensed key of the image keyboard that the user touches.

Thereafter, the method includes receiving product information (S1130). The product information may include at least one of product name, kind, quantity and price and event information, such as offered premiums, offered bonus products, etc.

The input product information will be displayed later on the transparent display panel based on user touch input or selection, which may result in provision of various pieces of product information and improved product advertisement effects.

Meanwhile, information regarding the predetermined area 1220 and the product information are mapped to each other and then stored (S1140).

Figure 14:
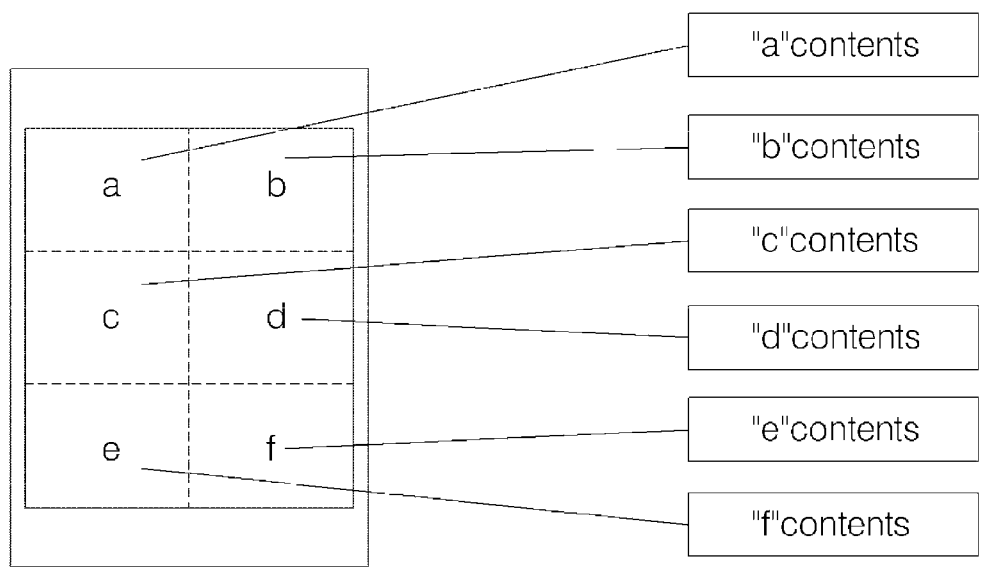

FIG. 14 shows that the showcase system is divided into six showrooms designated by a, b, c, d, e and f respectively. When the user touches a point in an area of a panel corresponding to the showroom a, the area corresponding to the showroom a is a selected as the aforementioned predetermined area.

Meanwhile, information regarding areas corresponding to the showrooms a, b, c, d, e and f may be mapped respectively to "a" content, "b" content, "c" content, "d" content, "e" content and "f" content and then stored. The above enumerated content may include the product information as described above.

In addition, the content may include moving images or still images associated with the product information.

Alternatively, even in a case in which moving images or still images are not included in the product information, image data may be acquired via additional input or in an automated manner via a network. In the embodiment of the present invention, the method may further include mapping the information regarding the predetermined area, the product information and an image associated with the product to one another to store the same.

Through use of the image keyboard, for example, in a state in which a product A is displayed at the area corresponding to the showroom a, the user may implement mapping of content, product information, webpage hyperlink and the like, which are sorted on a screen.

Figure 15:
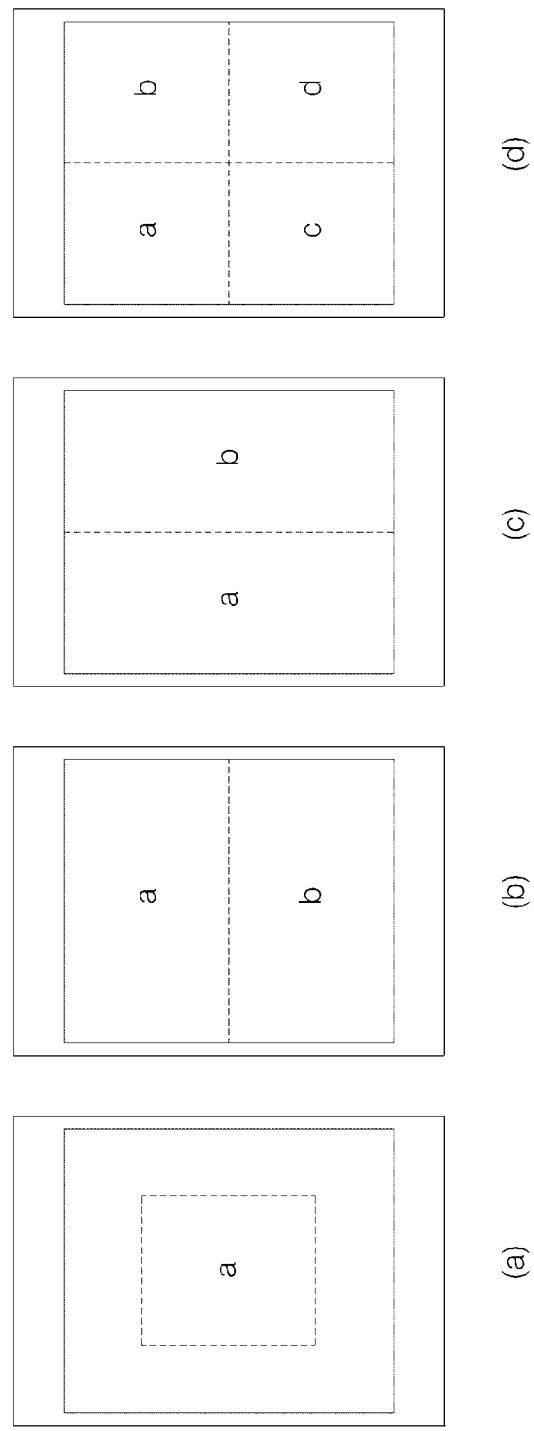

FIG. 15 shows various other layouts of areas divided in a transparent display panel or divided showrooms different from the example of FIG. 14.

In FIG. 15, (a) shows provision of a single area, (b) shows division into two upper and lower areas, (c) shows division into two left and right areas and (d) shows division into four areas. It will be clearly understood that various other examples with regard to division of areas not included in the various layout examples of FIG. 15 are possible.

Meanwhile, division of showrooms has been described above with reference to FIGS. 6 and 7 and thus a description thereof will be omitted hereinafter.

Meanwhile, division of areas of the transparent display panel and division of showrooms may not coincide with each other. Thus, division of areas of the transparent display panel may be changed according to user setting input.

Figure 17:
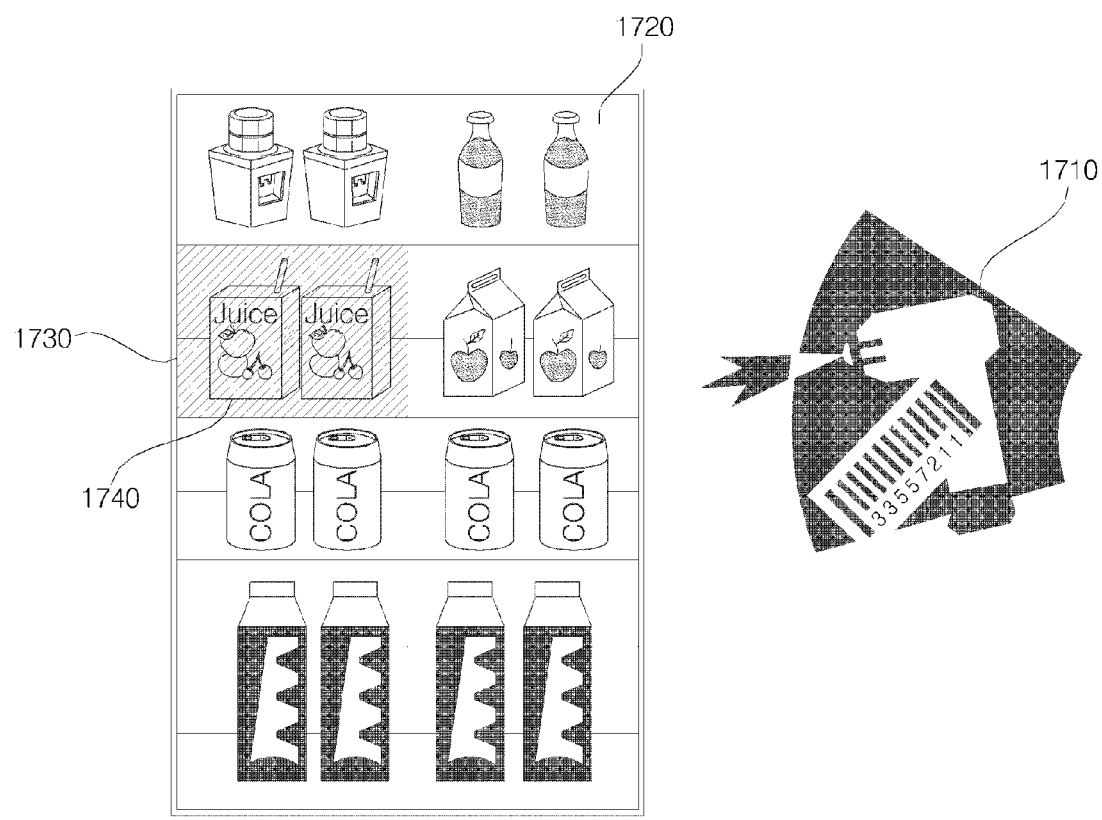
FIG. 17 is a reference view for explanation of various examples of the showcase system operating method of FIG. 16.

FIG. 16 is a flowchart showing a showcase system operating method according to an embodiment of the present invention, and FIG. 17 is a reference view for explanation of various examples of the showcase system operating method of FIG. 16.

Referring to the drawings, a method for operating a showcase system having a transparent display panel according to the embodiment of the present invention first includes recognizing a predetermined product 1730 (S1610).

The recognizing the predetermined product S1610 may be implemented by recognizing the predetermined product 1730 using a barcode scanner 1710 or a camera.

Alternatively, an image keyboard may be used, an input device included in a signal processing device may be used, or a camera may be used as a device for collecting product information.

The camera may recognize each exhibited product by analyzing a captured image and concatenate a position of the recognized product with a specific area of the transparent display panel in front of the product in an automated manner.

Meanwhile, upon recognition of the product, the camera may be connected to a POS system in a store to share product information.

Thereafter, upon receiving touch input to a predetermined area 1740 of the transparent display panel 1720 (S1620), information regarding the predetermined area 1740 and information regarding the predetermined product 1730 are mapped to each other to thereby be stored (S1630).

That is, as compared to the above embodiments described with reference to FIGS. 11 to 15, the present embodiment has a difference in that recognition of a product is first implemented and thereafter an area for mapping is designated, and the other features thereof may be equal or similar in the above embodiments.

Accordingly, the information regarding the predetermined product may include at least one of product name, kind, quantity, price and event information, and the method may further include mapping the information regarding the predetermined area, the information regarding the predetermined product and an image associated with the product to one another to store the same.

According to the present invention, in a state in which a plurality of products is exhibited, a product display circumstance is recognized to display various pieces of information regarding the products and the exhibited products and information regarding the products may be managed in connection with each other.

Meanwhile, the area selected by the touch input may be displayed differently from the other areas for differentiation as exemplarily shown in FIG. 17.

Meanwhile, in the embodiment of the present invention, the method may further include displaying information regarding division of areas of the transparent display panel.

As exemplarily shown in FIG. 17, a selectable area may be represented by dotted lines and the like, and divided forms of areas may be represented.

Coordinates of a reference position of shelves for exhibition of products in a transparent showcase system may be displayed. That is, coordinates may be displayed on a screen and shelves for supporting products may be displayed at corresponding coordinates.

Thereafter, upon exhibition of the products, mapping of information regarding coordinates on the screen, information regarding a product placed at a predetermined position and content may be implemented by touching the screen.

Figure 18:
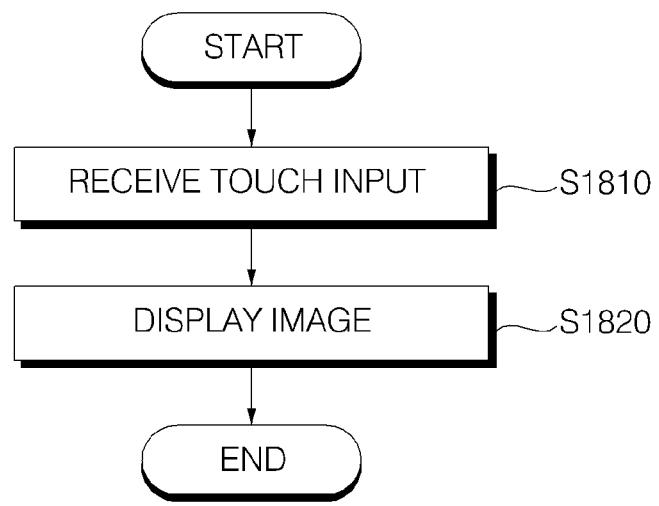
FIG. 18 is a flowchart showing a showcase system operating method according to an embodiment of the present invention.
Figure 19:
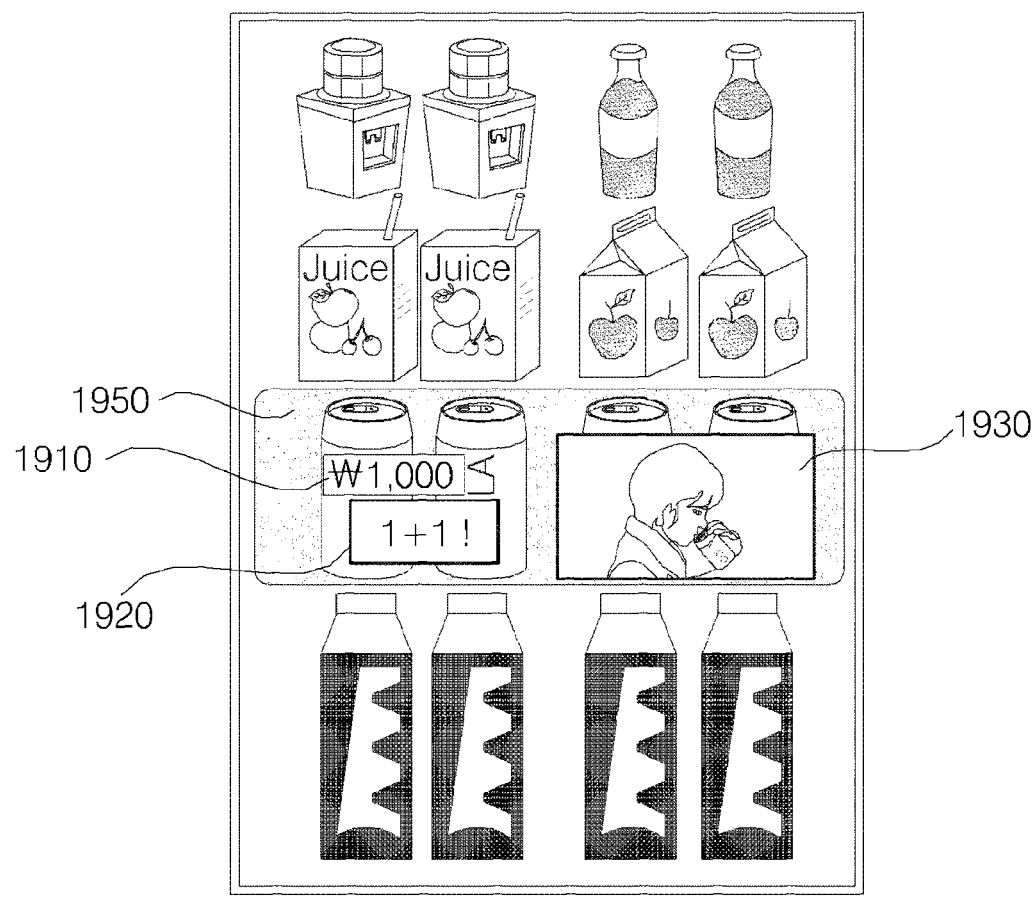
FIGS. 19 and 20 are reference views for explanation of various examples of the showcase system operating method of FIG. 18.
Figure 20:
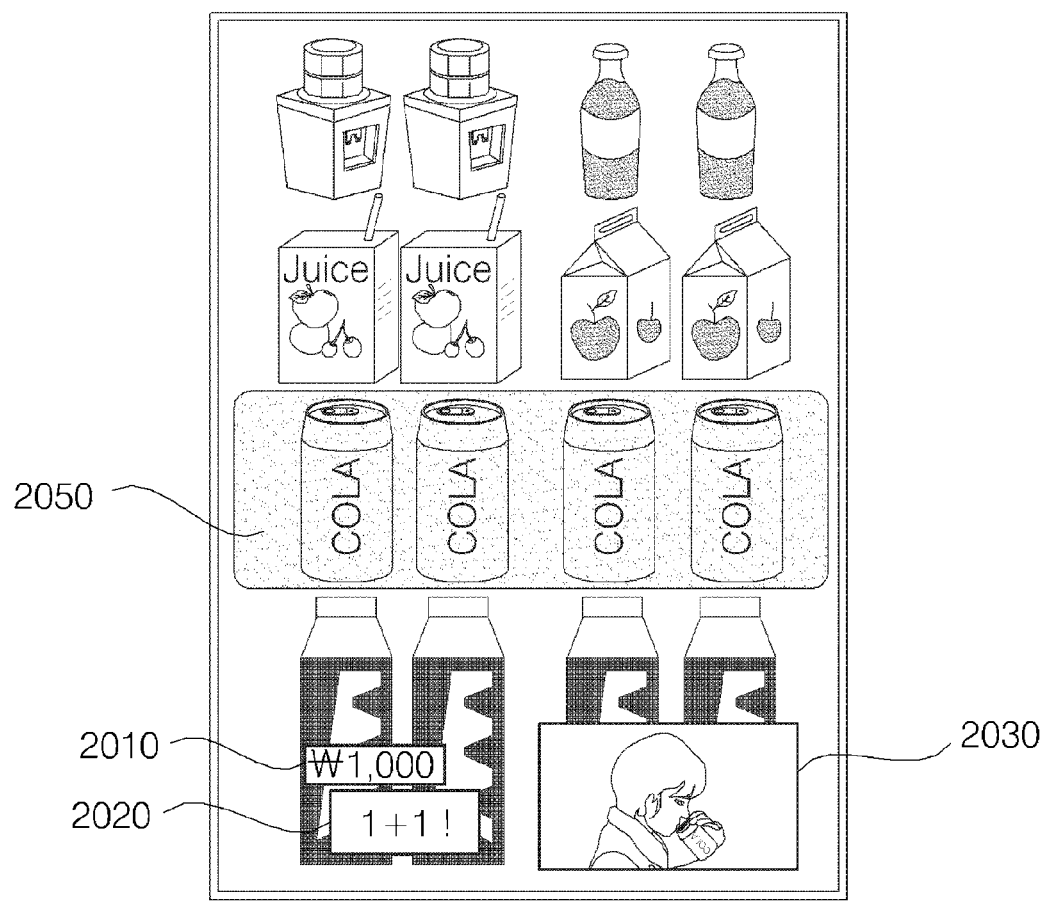

FIG. 18 is a flowchart showing a showcase system operating method according to an embodiment of the present invention, and FIGS. 19 and 20 are reference views for explanation of various examples of the showcase system operating method of FIG. 18.

A showcase system according to the embodiment of the present invention may include a plurality of showrooms for exhibition of products and a transparent display panel located at the front side of the showrooms.

Meanwhile, upon receiving touch input to at least one of the plural showrooms in which the products are exhibited (or areas of the transparent display panel corresponding to the showrooms) via the user input interface unit 150 (S1810), an image associated with a product corresponding to the showroom that has received the touch input is displayed (S1820).

The user touch input may correspond to an interrupt for switching to an information provision mode. In an alternative embodiment in which there is no interrupt corresponding to touch input, content regarding the product may be played back via sequential circulation of stored content.

Meanwhile, when the user touches an area (corresponding to a showroom a) on a screen, "a" content regarding a product A may be played back and seen by the user. The stored content may be a content package having so-called story-line.

The image associated with the product corresponding to the showroom that has received the touch input may include information regarding the product corresponding to the showroom that has received the touch input.

In addition, the product information may include at least one of product name, kind, quantity, price and event information.

Meanwhile, the signal processing device 400 may output an image associated with the product corresponding to the showroom that has received the touch input, and the transparent display panel may display the image on the area of the transparent display panel corresponding to the selected showroom.

Meanwhile, in the displaying the image S1820, the image may be displayed such that at least a portion of the image overlaps the area corresponding to the showroom that has received the touch input.

Alternatively, the displaying the image S1820 has a feature that the image is displayed at the area of the transparent display panel corresponding to the selected showroom.

Referring to FIG. 19, product information, such as product price 1910, event information 1920, etc., and an advertisement image 1930 may be displayed to fall in an area 1950 corresponding to the selected showroom.

The present invention using the transparent display panel may maximize advertisement effects by displaying a real product and an image associated with the product such that the product and the image at least partially overlap each other.

Alternatively, as exemplarily shown in FIG. 20, product information, such as product price 2010, event information 2020, etc., and an advertisement image 2030 may be displayed at an area different from a touched area 2050 so as not to overlap the touched area.

Differently from the related art in which exhibited products and information regarding the products (e.g., product price, product explanation and sales advertisements) are separately managed, according to the present invention, a product exhibition stand and a display unit may be linked to each other to enable display of product information in an effective manner.

A showcase system including a transparent display panel and an operating method thereof according to the present invention should not be limited to configurations and methods of the embodiments as described above, and some or all of the embodiments may be selectively combined with one another to enable various alterations thereof.

Meanwhile, the operating method of the showcase system according to the present invention the control method of the display apparatus in accordance with the present disclosure may be implemented as code that may be written on a processor readable recording medium and thus read by a processor provided in the showcase system. The processor readable recording medium may be any type of recording device in which data is stored in a processor readable manner. Examples of the processor readable recording medium may include a ROM, a RAM, a CD-ROM, a magnetic tape, a floppy disc, and an optical data storage device. In addition, the processor readable recording medium includes a carrier wave (e.g., data transmission over the Internet). Also, the processor readable recording medium may be distributed over a plurality of computer systems connected to a network so that processor readable code is written thereto and executed therefrom in a decentralized manner.

Although the preferred embodiments of the present invention have been illustrated and described, those skilled in the art will appreciate that the present invention should not be limited to the above specific embodiments and various modifications thereof are possible without departing from the scope and spirit of the invention as disclosed in the accompanying claims and these modifications should not be understood independently of the technical idea of the present invention.

The invention claimed is:

1. A method for operating a showcase system, the showcase system having a transparent display panel, the method comprising:
    uniformly transmitting light to a lower and an upper of a plurality of showrooms in which products are exhibited such that light reaches products exhibited on the lower showroom without being blocked by the upper showroom;
    receiving touch input to a predetermined area of the transparent display panel;
    displaying an image keyboard;
    receiving product information; and
    mapping information regarding the predetermined area and the product information to each other to store the same,
    wherein the showcase system includes:
        the plurality of showrooms in which products are exhibited,
        the transparent display panel placed at a front side of the showrooms,
        a light source unit including a plurality of lamps arranged obliquely in a direction from a position on the front side of the showrooms above the transparent display panel to a position on a top side of the showrooms such that the light is transmitted uniformly to the plurality of showrooms, and
        transparent frames placed at right and left sides of the showrooms.

2. The method according to claim 1, wherein in the displaying, the image keyboard is displayed such that at least a portion of the image keyboard overlaps the predetermined area.

3. The method according to claim 1, wherein the product information includes at least one of product name, kind, quantity, price and event information.

4. The method according to claim 1, further comprising mapping the information regarding the predetermined area, the product information and an image associated with the product to one another to store the same.

5. The method according to claim 1, wherein each of the showrooms includes a shelf on which the products are exhibited, and
wherein a shelf of the lower showroom has a longer length than a shelf of the upper showroom so that the uniform light reaches products on the shelf of the lower showroom without being blocked by the shelf of the upper showroom.

6. A method for operating a showcase system, the showcase system having a transparent display panel, the method comprising:
uniformly transmitting light to a lower and an upper of a plurality of showrooms in which products are exhibited such that light reaches products exhibited on the lower showroom without being blocked by the upper showroom;
recognizing a predetermined product in any of the plurality of showrooms provided the uniformly transmitted light;
receiving touch input to a predetermined area of the transparent display panel; and
mapping information regarding the predetermined area and information regarding the predetermined product to each other to store the same,
wherein the showcase system includes:
the plurality of showrooms in which products are exhibited,
the transparent display panel placed at a front side of the showrooms,
a light source unit including a plurality of lamps arranged obliquely to transmit the light uniformly to the plurality of showrooms, and
transparent frames placed at right and left sides of the showrooms.

7. The method according to claim 6, further comprising displaying information regarding division of areas of the transparent display panel.

8. The method according to claim 6, wherein the information regarding the predetermined product includes at least one of product name, kind, quantity, price and event information.

9. The method according to claim 6, further comprising mapping the information regarding the predetermined area, the information regarding the predetermined product and an image associated with the product to one another to store the same.

10. The method according to claim 6, wherein, in the recognizing, the predetermined product is recognized via a barcode scanner or a camera provided the uniformly transmitted light and a position of the predetermined product is concatenated with the predetermined area of the transparent display panel in front of the product.

11. The method according to claim 10, wherein each of the showrooms includes a shelf on which the products are exhibited, and
wherein a shelf of the lower showroom has a longer length than a shelf of the upper showroom so that the uniform light reaches products on the shelf of the lower showroom and the predetermined product is recognized via the barcode scanner or the camera.

* * * * *